United States Patent [19]

Gorman et al.

[11] Patent Number: 4,513,413

[45] Date of Patent: Apr. 23, 1985

[54] COMMUNICATION SET AND METHOD

[75] Inventors: Anthony G. Gorman, Ruislip; Peter L. Smith, Prestwood; Paul Q. Barrett, Hemel Hempstead, all of England

[73] Assignee: Racal Acoustics Limited, England

[21] Appl. No.: 438,450

[22] Filed: Nov. 2, 1982

[30] Foreign Application Priority Data

Nov. 4, 1981 [GB] United Kingdom ............... 8133303

[51] Int. Cl.³ .............................................. H04J 1/06
[52] U.S. Cl. ......................................... 370/30; 370/76
[58] Field of Search ................... 370/30, 74, 69.1, 76, 370/60; 179/18 BC

[56] References Cited

U.S. PATENT DOCUMENTS

| 3,573,379 | 4/1971 | Schmitz | 179/15 |
| 3,809,815 | 5/1974 | Reed et al. | 370/30 |
| 3,809,816 | 5/1974 | Reed et al. | 370/30 |
| 4,020,289 | 4/1977 | Anderson | 179/1.5 FD |
| 4,262,171 | 4/1981 | Schneider | 370/30 |
| 4,339,816 | 7/1982 | Reed | 370/76 |

FOREIGN PATENT DOCUMENTS

| 1175130 | 12/1969 | United Kingdom . |
| 1185789 | 3/1970 | United Kingdom . |
| 1476345 | 6/1977 | United Kingdom . |
| 1511499 | 5/1978 | United Kingdom . |

Primary Examiner—Douglas W. Olms
Assistant Examiner—Frank M. Scutch, III
Attorney, Agent, or Firm—Beveridge, De Grandi & Weilacher

[57] ABSTRACT

A telephone communication method provides simultaneous duplex channels between respective pairs of stations over a single wire pair highway by frequency division multiplexing. Each duplex channel has a predetermined pair of carrier frequencies, but only carrier frequency pairs of channels in use for communication are present in the highway at any time. On initiating a call, a station seeks for a free channel and reserves it by generating the "go" carrier of the free channel modulated with the call sign of the desired station, and also generating an alert signal. Quiescent stations respond to the alert by seeking a "go" carrier with call sign data and, on identifying their own call sign, generating the corresponding return carrier to set up the channel.

10 Claims, 6 Drawing Figures

COMMUNICATION SET AND METHOD

BACKGROUND OF THE INVENTION

The present invention is concerned primarily with a communication method providing duplex communication simultaneously between a plurality of pairs of stations on a single wire pair highway by frequency division multiplexing. Frequency division multiplexing to provide several channels on a single pair of wires is known for telephony. However, in telephone systems employed hitherto, the various carrier frequencies providing the frequency division multiplexed channels on the single wire pair are provided continuously irrespective of whether a particular channel is busy. This arrangement is quite satisfactory for large scale telephone installations where power consumption is of only minor concern. However, to provide frequency division multiplexing using known techniques for field telephone applications, operating from battery power supplies, would make excessive demands on the battery supplies enabling only relatively short life operation. Also, such an arrangement would reduce the flexibility of the field telephone system since the various stations on the field telephone "net" would have to operate through exchange apparatus which would provide channel routing and maintain the various frequency carrier signals.

SUMMARY OF THE INVENTION

According to one aspect of the present invention, there is provided a communication method providing duplex communication simultaneously between a plurality of pairs of stations on a single wire pair highway by frequency division multiplexing, wherein information is transmitted on the wire pair highway by modulation of pairs of predetermined carrier frequencies, each pair of said frequencies comprising a "go" frequency and a "return" frequency and providing a single channel for duplex communication between any selected pair of stations on the highway, and wherein only carrier frequency pairs actually in use for communication are present on the highway at any time. By eliminating the carrier signals which are not in use for communication, the power consumption of the arrangement can be greatly reduced and also the flexibility of operation especially in field telephone applications can be greatly increased.

Each station on the highway may be assigned a predetermined call code and a channel between a caller station and a desired called station may be opened by the caller station scanning the predetermined frequency pairs for a pair absent on the highway and responding to locating an absent frequency pair by generating and transmitting onto the highway the "go" frequency carrier of the pair and modulating said carrier with at least data defining the call code of the desired called station, and by the called station responding, if not busy with an existing call, to identifying its own call code modulated on the "go" frequency carrier by generating and transmitting onto the highway the "return" frequency carrier of the pair, in response to which the caller station ceases modulating with the call code and the duplex channel is opened.

With this method, the individual stations on the highway can themselves generate the various carrier frequency signals and first scan the existing carriers on the highway to select a free channel.

Conveniently, stations not in use are quiescent and the caller station also generates and impresses on the highway an alert signal to which all quiescent stations on the highway respond by becoming non-quiescent, scanning the predetermined carrier frequencies to identify a predetermined "go" frequency on the highway modulated with call code data, reading said data and comparing the call code with the respective code assigned to the station, whereby the called station can identify its own call code. Thus, the stations not in use can be in the quiescent state with minimal if not zero power consumption. However, they are arranged to respond to the alert signal on the highway by seeking for the "go" frequency carrier of the caller station and reading the call code. Only if the code is their own, do they remain non-quiescent and open the duplex channel by generating and transmitting to the highway the corresponding "return" frequency carrier.

The caller station preferably responds to receiving the "return" frequency carrier from the called station also by cancelling the alert signal from the highway, whereupon stations not in use other than the called station revert to the quiescent state. On detecting an alert signal on the highway, said previously quiescent stations scan the carrier frequencies by scanning the predetermined "return" frequencies to identify a "return" frequency absent from the highway, on locating an absent return frequency tuning to the corresponding "go" frequency of the respective pair and, if the "go" frequency carrier is present on the highway, checking for call code data on the carrier, but otherwise continuing the scanning of the "return" frequencies. By this technique, the overall scanning time is reduced since "go" frequencies are checked only if there is no corresponding "return" frequency. It will be understood that if there is a "return" frequency carrier already on the highway then this indicates that the particular channel is already in use and cannot be the channel on which the new call is being placed.

In a further preferred arrangement, where the method of signalling is used for telephony, the method may provide a conference mode wherein a conference can be set up between a plurality of stations simultaneously using telephone audio frequency signalling on the highway. In the conference mode, the caller station may modulate the generated "go" frequency carrier with data defining the call codes of the selected called stations desired to join the conference and also identifying the call as a conference call, the caller station terminating said carrier generation and modulation after a predetermined time interval sufficient to permit the called stations to identify their respective call codes and then providing audio frequency communication with the highway, and each called station may respond to identifying its call code and that the call is a conference call by providing audio frequency communication with the highway.

In a further preferred arrangement, a priority mode is provided, wherein a selected pair of said carrier frequencies is set aside as a priority channel for use only by a priority caller station in priority mode to a station already busy with an existing call or when all non-priority channels are busy, and the station called on the priority channel then responds by breaking contact with any existing call and moving onto the priority channel to take the priority call. In the priority mode, a priority caller station first checks the "go" frequency of the priority channel and, if the carrier is absent on the highway, generates and transmits the carrier onto the highway modulating said carrier with at least data defining the call code of the desired called station, and simultaneously generating and impressing on the highway a priority call identifying signal, any or each busy station responding to the priority call identifying signal by tuning to the "go" frequency of the priority channel, reading said call code data and comparing the call code with the respective code assigned to the station, and then in response to identifying its own call code moving onto the priority channel but otherwise continuing with the existing call.

Conveniently, in normal mode, said alert signal may be maintained by the caller station, in the absence of a received corresponding "return" frequency carrier, for a predetermined maximum time, and then, in priority mode, said priority call identifying signal may comprise said alert signal maintained for a period in excess of said predetermined maximum time, whereby any or each busy station responds only after said maximum time has elapsed.

The alert signal, and also the priorty call identifying signal, may comprise a DC voltage impressed on the highway by the caller station. It will be appreciated that any non-busy station responds to the priority call identifying signal in the same way as to the alert signal, i.e. by reverting to a non-quiescent state and scanning the "go" carrier frequencies on the highway for its own call code. All stations are arranged to scan all channels, including the priority channel in response to an alert signal, so that a priority channel call to a station which is not busy, will still be connected.

In another aspect of the present invention, there is provided a communication set capable of providing, with other such sets at respective stations, duplex communication simultaneously between a plurality of pairs of stations on a single wire pair highway by frequency division multiplexing, wherein information is transmitted on the wire pair highway by modulation of pairs of predetermined carrier frequencies, each pair of said frequencies comprising a "go" frequency and a "return" frequency and providing a single channel for duplex communication between any selected pair of stations on the highway, each station being assigned a predetermined call code; the signalling set having means for storing the call code assigned to the respective station, transmitter means energisable and controllable to generate and transmit to the highway carrier signals at a selected one of the predetermined carrier frequencies, modulator means for modulating the generated carrier signal with information or data to be transmitted on the highway, tunable receiver means for selectively receiving carrier signals from the highway at any one of the predetermined carrier frequencies, demodulator means for demodulating information or data from the received carrier signal, operator input means enabling the operator of the set to initiate a call and key in the call code of a desired station, and control means responsive to a call initiate signal from the input means to scan the tuning of the receiver means through said predetermined carrier frequencies until a vacant channel is identified, the respective pair of carrier frequencies for the channel being absent on the highway, and then to tune to the "return" frequency of the vacant channel, the control means being then responsive to energise and control the transmitter means to transmit on to the highway a carrier signal at the "go" frequency of the vacant channel and simultaneously supply to the modulator means at least data from the input means defining the call code of the desired station so that the transmitted carrier signal is modulated with said data, the control means being further responsive to reception by the receiver means of a carrier on the highway at the "return" frequency of the vacant channel to inhibit further supply of the call code data to the modulator means.

Preferably, the communication set includes an alert signal generator responsive to the control means on identifying a vacant channel to impress an alert signal on the highway until reception by the receiver means of said "return" frequency carrier. Preferably also, the signalling set has quiescent switching means arranged to switch the set to a quiescent state when not in use, but responsive to the presence of an alert signal on the highway to switch the set automatically to a non-quiescent state and the control means being responsive on said switching to the non-quiescent state to scan the tuning of the receiver means to detect a "go" frequency carrier signal on the highway which is modulated with call code data and then to read said data and compare the received call code with that in said means for storing, the control means being further responsive to the received call code matching that in said means for storing to hold the set in the non-quiescent state and to energise and control the transmitter means to transmit onto the highway a carrier signal at the "return" frequency of the channel including the detected "go" frequency carrier signal.

DETAILED DESCRIPTION OF A PREFERRED EXAMPLE

Figure 1:
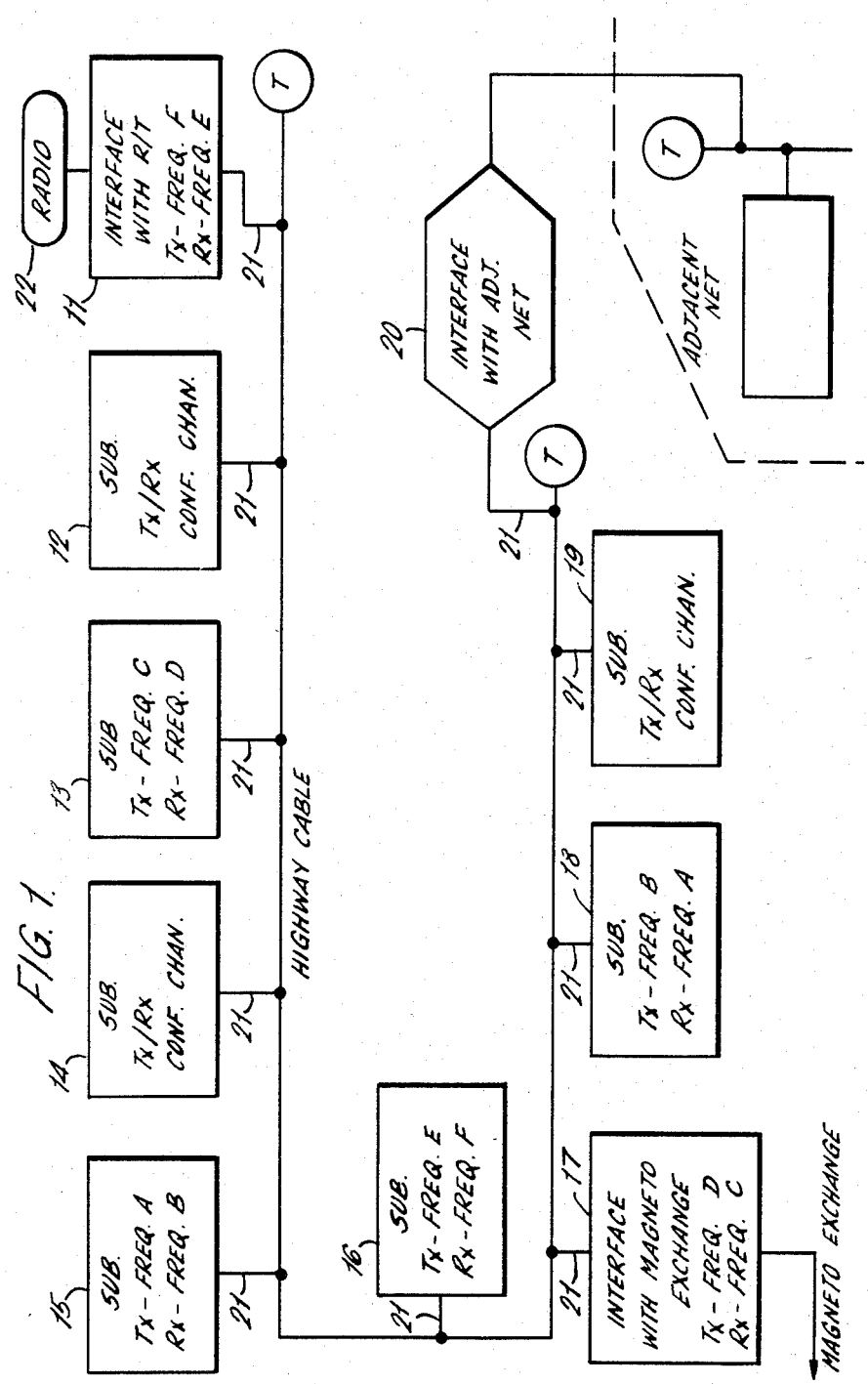
FIG. 1 is a block schematic diagram illustrating a complete net incorporating a plurality of "subscriber" sets connected to a single wire pair highway.

FIG. 1 illustrates a complete telephone net operating in accordance with an example of the present invention. The net is formed by a single highway cable 10 to which are connected a number of "subscriber" sets 11–20. The highway cable 10 comprises a single wire pair typically a twisted pair or a co-axial cable with single core and screen conductors. Each "subscriber" set is connected to the highway cable by a link 21 which connects the set to the two wires of the highway 10. The links 21 may be connected to the highway 10 by means of connector clips which make connection to the conductors of the highway without breaking the highway at the connection point. A suitable form of connector which in one embodiment can connect the "subscriber" set links 21 to a co-axial highway cable 10 is described in the specification of our co-pending application of today's date (U.K. Application No. 8133302).

The "subscriber" sets 11–20 may be of different types. In FIG. 1, sets 12–16 and 18 and 19 are telephone "subscriber" sets for use directly by users of the system. However, sets 11, 17 and 20 are interface units of different kinds. Set 11 is an interface unit which enables callers on the net to interface with a radio telephone apparatus 22. Set 17 provides an interface with a magneto telephone exchange and set 20 provides an interface with another telephone net of the same kind as illustrated in FIG. 1. The detailed operation of interfaces 11, 17 and 20 will not be described in this specification. It is sufficient to know that each interface appears from the point of view of the telephone net incorporating the highway 10 to mimic an ordinary telephone "subscriber" set, providing the same responses to enable a channel to be opened between the interface and another "subscriber" on the highway.

In operation, the various "subscriber" sets connected to the highway cable 10 can call each other and several communications between pairs of sets can proceed simultaneously on the single highway cable 10. A plurality of communication channels are provided on the cable 10 by frequency division multiplexing (FDM) and the system is arranged so that the carrier frequencies in the FDM system are present on the highway cable 10 only when the particular channel is being used for communication. The system includes no central exchange or control unit and all the carrier frequencies and control systems are provided in the various "subscriber" sets.

Figure 2:
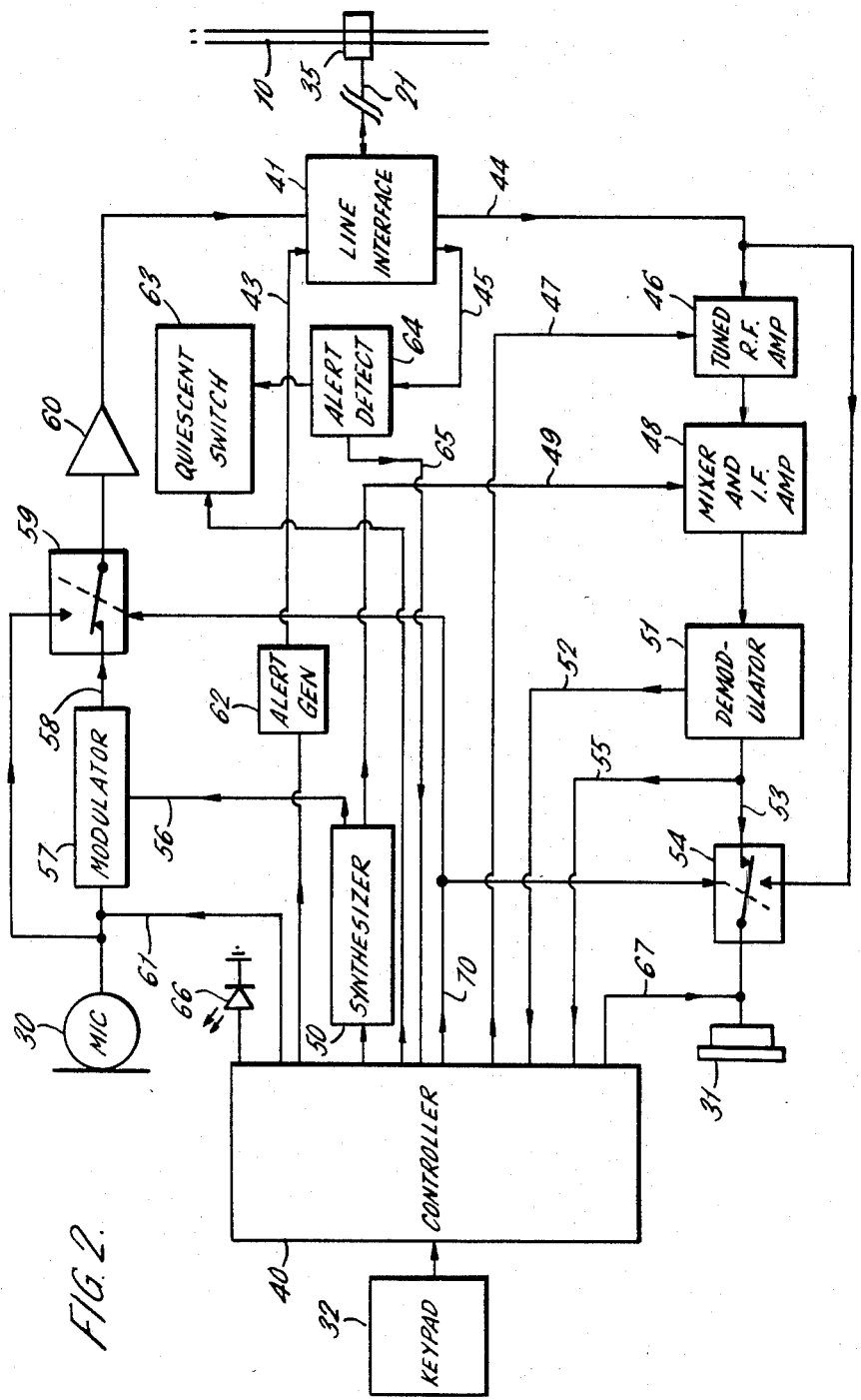
FIG. 2 is a block schematic diagram of a telephone "subscriber" set shown connected to a single wire pair highway.
Figure 3:
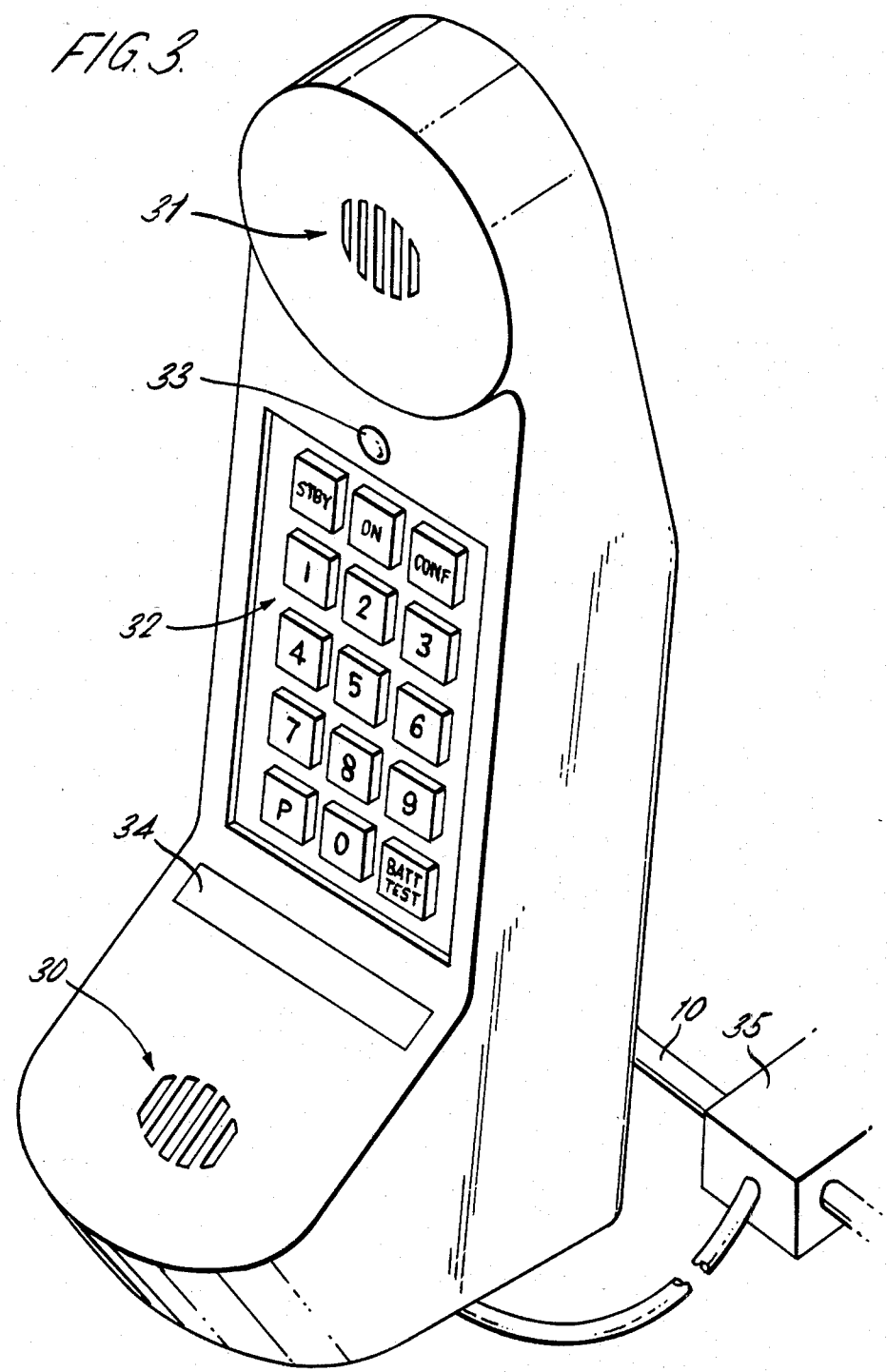
FIG. 3 illustrates an example of the telephone "subscriber" set provided as a single hand held unit and FIGS. 4, 5 and 6 are operational flow diagrams illustrating the sequences of steps in operating the complete telephone system in various different modes.

Referring now to FIG. 2, a block circuit diagram is illustrated of a typical "subscriber" set incorporating microphone 30 and receiver 31 for use as a typical telephone. The entire circuitry illustrated in FIG. 2 may be incorporated in a single housing with the microphone 30 and receiver 31 to provide a single instrument as illustrated in FIG. 3. The instrument incorporates a key pad 32 enabling a user of the instrument to control operation and insert the call codes of stations the user wishes to call up. Thus, the key pad 32 provides separate keys for each of the decimal digits 0-9 and function control keys identified as follows: STDY (standby), ON, CONF (conference), P (priority call), and BATT TEST (battery test). The hand set illustrated in FIG. 3 also incorporates a visual alarm light 33 which can be actuated to flash in response to an incoming call instead of the usual audible alarm tone. The alarm lamp 33 also doubles to provide a battery test indicator to provide an indication of battery state when the BATT TEST key on the key pad 32 is depressed.

The hand set is powered by batteries provided within the casing of the unit.

A panel 34 shown in FIG. 1 can be removed to expose manually adjustable switches by which the hand set can be assigned the call code to which the hand set is to respond when on the telephone net.

The hand set can be connected to the cable highway 10 by means of a connector clip 35 as illustrated in FIG. 1. The connector clip 35 makes connection to the conductors of the highway cable 10 without breaking the cable.

Referring now to the block schematic diagram of FIG. 2 in more detail, the various functions of the circuitry illustrated in FIG. 2 are controlled by means of a controller 40 which receives data keyed into the set on the key pad 32. The controller 40 may typically be embodied as a microprocessor programmed to perform the various predetermined functions as required. To provide a functional programme for such a microprocessor controlled arrangement is well within the capacity of an experienced practitioner in this art without the need for undue experimentation. The circuit of FIG. 2 can be connected to the highway cable 10 via a line interface 41 which transmits signals supplied to the line interface on lines 42 or 43 onto the highway cable 10 via connecting link 21 and highway cable connector 35. Similarly, signals from the highway cable are supplied from the line interface 41 on lines 44 and 45. The line interface unit 41 ensures that the "subscriber" set presents a high impedance across the conductors of the highway cable 10 so as to minimise any effect on the transmission properties of the highway.

Carrier frequency signals from the highway are supplied from the line interface on line 44 to a tuned radio frequency amplifier 46, the tuning of which is controlled by signals on a line 47 from the controller 40. The tuned radio frequency amplifier 46 is controlled by the controller 40 to pass and amplify only a band of frequencies centred on the particular carrier frequency to which the receiving circuits of the set are being tuned at any time. The signals from the amplifier 46 are then supplied to a mixer and intermediate frequency amplifier 48 which receives a local oscillator signal on a line 49. The local oscillator signal is derived by a synthesizer 50 under the control of the controller 40. Thus, the controller 40 can affect tuning of the receiver by controlling the synthesizer 50 to synthesize a desired local oscillator frequency on line 49 which when mixed with the intended received carrier frequency produces a difference frequency at the intermediate frequency of the IF amplifier 48.

The amplified IF carrier signal is supplied to a demodulator 51 wherein modulation on the carrier is detected. In the presently described system, the modulation on the various carrier frequency signals is frequency modulation and so the demodulator 51 may be any known type of FM detector, for example a quadrature detector. The demodulator 51 provides a carrier detect signal on a line 52 to the controller 40 on detection of a carrier signal at the frequency to which the receiver is tuned. The demodulated information from the detected carrier is supplied on an output line 53 to the receiver 31 via a switch 54 which in normal operation of the apparatus is closed as shown in FIG. 2. The output from the demodulator 51 is also supplied on a line 55 to the controller 40 whereby code signals modulated on the received carrier can be read and decoded by the controller 40 as will be explained later.

Considering now transmission by the circuitry of FIG. 2, the carrier frequency of the transmission is derived also by the synthesizer 50 subject to the control of the controller 40. As explained previously, the complete radio telephone system is arranged to have predetermined pairs of carrier frequencies, one pair defining a duplex communication channel. Each pair of frequencies defining a channel comprises a predetermined "go" frequency and a predetermined "return" frequency. All the various frequencies of the different channels available on the system are defined on setting up the system and may be stored in the controller 40, typically in the memory of the microprocessor constituting the controller 40. In operation, when a caller station calls up a called station, the caller station transmits carrier on the "go" frequency of a selected channel and the called station transmits back on the "return" frequency. Thus, the controller 40 controls the synthesizer 50 to generate suitable signals on line 49 to the mixer and IF amplifier 48 and on a line 56 to a modulator 57, such that when a channel is established with another station, the transmitted carrier is at one frequency of a predetermined pair and the receiver is tuned to the other frequency of the pair depending on whether the set was the caller station or the called station.

The transmitted carrier frequency from the synthesizer 50 is frequency modulated in the modulator 57 by signals from the microphone 30 and the modulated carrier is fed on a line 58 via a normally closed switch 59 and a booster amplifier 60 to the output line 42 to the line interface 41 for transmission onto the highway 10. The modulator 57 is also arranged to modulate the transmitted carrier with code signals provided from the controller 40 on a line 61. As will be explained later, code signals are supplied by the controller 40 for modulation on the transmitted carrier frequency during the call-up procedure and include the call code of the station being called up.

Also during the call-up procedure, as will be explained later, the controller 40 signals an alert generator 62 to generate an alert signal on the line 43 to impress the alert signal on the highway cable 10. The alert signal is typically a DC voltage applied across the conductors of the highway 10.

When the apparatus is not in use for a call, the circuitry of the apparatus is in a quiescent state and is effectively switched off so that there is minimal or zero drain on the battery supply of the set. A quiescent switch 63 is illustrated symbolising the operation of the circuit in this respect. The quiescent switch 63 may operate to render the circuitry quiescent in response to a signal from the controller 40, typically in response to depressing the STBY key on the key pad 32. However the quiescent switch 63 is also arranged to operate automatically following certain functions of the apparatus including switching off the apparatus after a predetermined delay if an intended call cannot be established.

If an alert signal is applied to the highway 10 by some other station, this signal is received by the line interface 41 and applied to the line 45 to an alert detector 64. The alert signal, comprising a DC voltage, is passed on by the alert detector 64 to the quiescent switch 63 causing the switch to put the circuitry of the apparatus in a non-quiescent condition. At the same time, the alert detector 64 signals the controller 40 on a line 65 to show that there is an alert signal on the highway. As will be explained in more detail later, the controller 40 responds to the alert signal by checking to see if the particular station is the one being called up, and if it is by identifying and sending the "return" frequency carrier signal to establish the duplex communication channel. On recognising a call intended for the particular station, the controller 40 also generates an alarm signal until a user answers the call. The alarm signal may be the usual audible alarm tone supplied on line 61 to drive the microphone 30, or may alternatively be a visual alarm from a light emitting diode 66.

The controller 40 is arranged also to generate various other tones on a line 67 to drive the receiver 31. These tones may include usual dial, ringing and engaged tones. The dial and engaged tones are generated in the controller 40 of the apparatus attempting to make the call. The ringing tone on the other hand is generated by the controller of the called station and modulated on the "return" carrier frequency sent by the called station.

Figure 4:
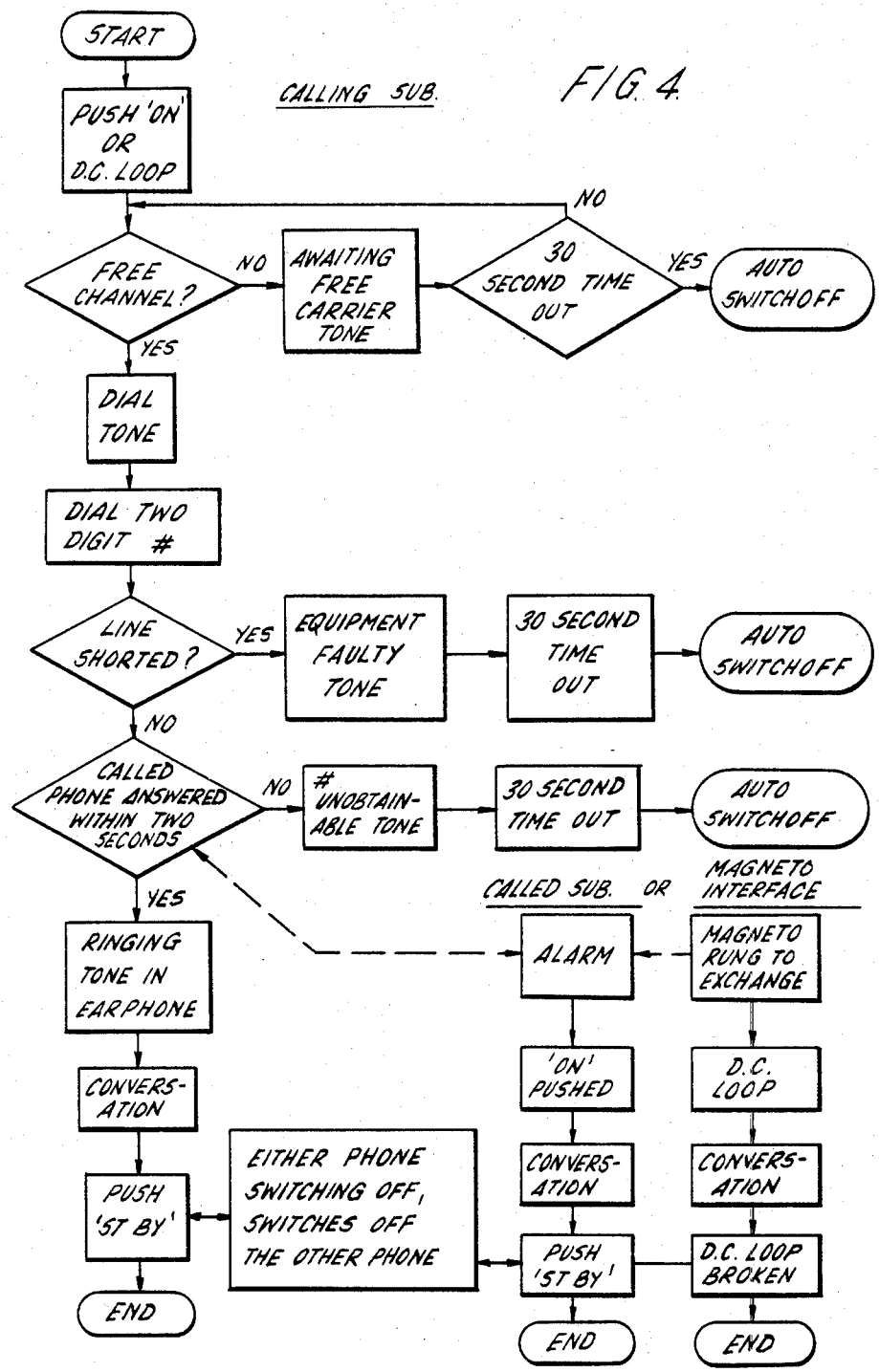

Referring now to FIG. 4, the functional operating procedure of the telephone system incorporating "subscriber" sets as illustrated in FIG. 2 is shown in the form of a flow diagram. A call is initiated at the caller station by the caller depressing key ON on the key pad 32. This action powers up the caller's hand set and the controller 40 immediately begins a search routine to identify a free channel for the call. In the search routine, the controller controls the synthesizer 50 to generate local oscillator frequencies on line 49, and simultaneously controls the tuned RF amplifier by signals on the line 47 so as to tune the receiver section of the set successively through the "go" frequencies of the various available channels. On tuning to a particular "go" frequency, the controller 40 responds to a carrier detect signal on line 52 by moving on to the next "go" frequency. If no carrier detect signal is observed at a particular "go" carrier frequency, the controller 40 instructs the synthesizer 50 to generate a carrier on line 56 at this "go" frequency and this "go" frequency carrier is applied to the highway 10. However, if all available "go" frequency carriers are already on the highway, the controller 40 continues to cycle through the channels looking for a free channel and during this period provides a distinct tone on the line 67 to the receiver 31 indicating that a free carrier is being awaited. If no free carrier is identified within thirty seconds, the controller 40 causes the set to switch off and the user must start again, if desired, by pressing key ON. As soon as the controller 40 identifies a free "go" carrier and applies that "go" carrier to the highway 10, a dial tone is generated on line 67 to signal the user of the apparatus. The user then keys in the code of the station which it is desired to call. The stations in the present example, each have a two digit code and on depressing the key for the second digit of the code, the controller 40 generates a routing code on a line 61 which is modulated by the modulator 57 onto the "go" carrier frequency and sent on to the highway. At the same time, the controller 40 instructs the alert generator 62 to apply an alert signal to the highway 10 so as to alert quiescent stations connected to the highway.

Prior to sending the routing code and the alert signal, the apparatus may check the connecting link 21 to the highway 10 to ensure that the line is not shorted. If a short is detected, the controller 40 generates an equipment faulty tone on line 67 and after thirty seconds switches off.

The routing code generated by the controller 40 and transmitted on the "go" frequency carrier is transmitted repeatedly for the duration of the alert condition. The alert condition is terminated automatically by the controller 40 if no reply is received from the called station within a predetermined time, typically two seconds. However, the alert is removed immediately on receipt of a reply from the called station in the form of detecting the "return" frequency carrier on the same channel as the "go" frequency being transmitted.

The calling code may comprise repeated frames made up of three eight bit bytes followed by a control byte of typically at least two bits. The first eight bit byte of each frame is a synchronisation byte which may comprise four successive binary "1"'s followed by four successive binary "0"'s. This synchronisation byte can be recognised as such at the various receiving stations to permit the subsequent data bytes to be read by the receiving stations in correct synchronisation. The next eight bit byte may comprise the calling code, i.e. the code of the station making the call. The third eight bit byte may comprise the called code, i.e. the call code of the station being called up. The two bit control byte may include control data identifying the mode of the call as will become apparent later.

Considering now the apparatus of FIG. 2 as the station on line in quiescent state. On receiving an alert signal from the highway 10, the quiescent switch 3 automatically puts the apparatus in a non-quiescent condition whereupon the controller 40, in response to the alert detect signal on line 65 instructs the synthesizer 50 to tune the receiver section sequentially through the various "return" frequencies of the available channels. On identifying a "return" frequency at which there is no carrier detected on line 52, the controller 40 redirects the receiver to tune to the corresponding "go" frequency of that particular channel. If there is again no carrier signal present, the controller 40 instructs the receiver to go on to the "return" frequency of the next channel. On detecting a "go" frequency carrier present on a channel on which there is no "return" frequency carrier present, the controller 40 monitors the output of the demodulator on line 55 and trys to read any code signals demodulated from the carrier. The controller 40 repeatedly trys to read code signals from the line 55 and looks for a match between the called code read from the line 55 and its own call code. If no match is identified after a predetermined time, say two hundred miliseconds, the controller 40 instructs the receiver to move on to the "return" frequency of the next channel. The controller 40 continues to scan the channels until the alert signal is removed from the highway 10.

On successfully matching the called code read on the line 55 with its own call code, the controller 40 responds by instructing the synthesizer 50 to generate a carrier signal at the "return" carrier frequency of the same channel as the received "go" frequency carrier. At the same time the controller 40 generates ringing tone signals on line 61 which are modulated on the "return" carrier and can be heard at the caller station. Also at the same time, the controller 40 of the called station sets up an alarm signal, either generating an alarm tone in the microphone 30 corresponding to the ringing tone transmitted on the "return" carrier, or by flashing the visual alarm represented by the LED 66.

Back at the caller station, the receiving circuitry of the caller station's apparatus is already tuned to the "return" frequency of the channel being set up and generation of the "return" frequency by the distant called station is detected by the demodulator 51 and supplied as a carrier detect signal on line 52 to the controller 40 which reacts by removing the alert signal from the highway, whereupon all other stations cease continuing to scan for their own call codes and revert to the quiescent condition.

In order to answer the alarm tone or light signal at the called station, the user depresses the ON key of his set causing the controller 40 of his set to terminate generating the ringing tone and alarm signal on line 61. Conversation can then proceed between the caller and called stations via the respective microphones 30 and receivers 31. The conversation is frequency modulated and demodulated from the respective "go" and "return" frequency carrier signals.

On termination of the conversation, one or both parties presses the STBY key which causes his own set to revert to the quiescent condition removing its own generated carrier signal from the highway. Even if the other party does not press the STBY key, his own set also reverts to quiescent condition, on detecting that the received carrier signal has been removed from the highway.

The present example of the apparatus provides a priority mode which allows certain designated priority callers to make calls even when all normal channels are busy and also when the station they are calling is busy with an existing call. In the priority mode, one of the available channels of the system is set aside and is not used for normal intercommunication between the "subscriber" sets on the net. This channel set aside may be designated the priority channel and is used only for priority calls. In the particular arrangement described in this example, only certain "subscriber" sets are able to make priority calls. These are the "subscriber" sets with call codes starting with "0". Thus there are up to ten codes available for priority calling "subscriber" sets. The system operation whereby the priority channel is set aside, may also be determined by the call codes assigned to the "subscriber" sets on the net. Thus, if all sets on the net have call codes between "00" and "39", then these sets will operate so that the priority channel is set aside for priority calls only from the sets with call codes "00" to "09". On the other hand if the sets on the net have call codes between "40" and "99", then these sets are arranged to treat all channels available in the system equally so that there is no priority mode available. The operational distinction between the various call codes is performed by the controller 40 of the various sets in response to the call code assigned to the set.

Figure 5:
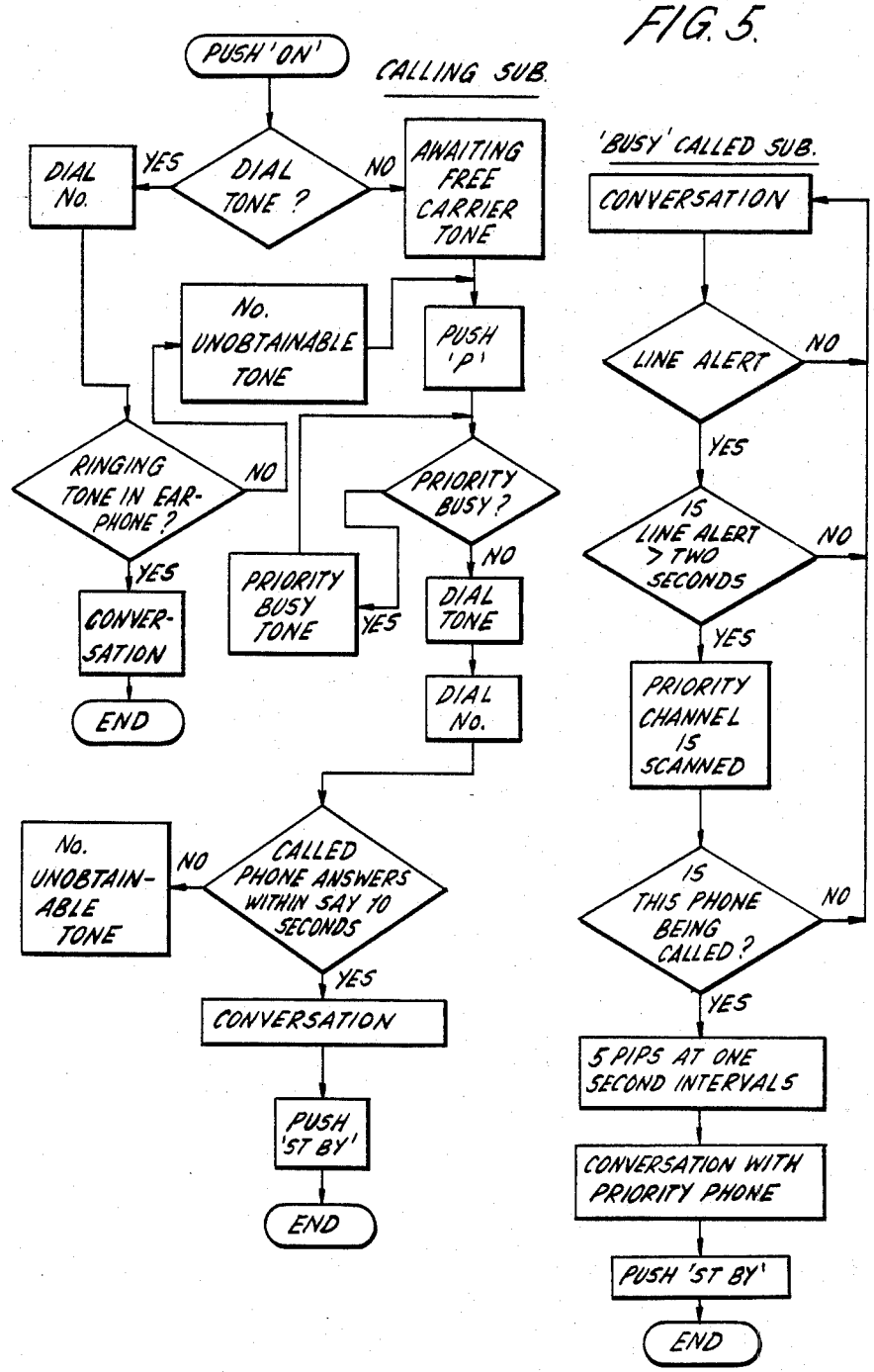

In the normal operation if a priority caller wishes to call a particular station, the usual initial operations are carried out as with a normal call. As shown in FIG. 5, the priorty procedure is used only if the priority caller cannot obtain a dial tone, indicating that all non-priority channels are busy, or on obtaining a dial tone and calling the desired "subscriber", obtains a number unobtainable tone indicating that the called station has not answered the call and is probably busy with an existing call. In either of these cases, the priority caller makes the priority call by pressing key P on his key pad. In response, the controller 40 of his set tunes the receiver to the "go" frequency of the priority channel. If a carrier is detected at the "go" frequency, the controller 40 generates a priority busy tone. However if the priority channel is not busy, the controller 40 controls the synthesizer 50 to generate the carrier signal on line 56 at the "go" frequency of the priority channel and produces a dial tone. The priority caller then dials the call code of the station to be called, whereupon the controller 40 sets up the alert signal on the highway 10 and sends data on line 61 for modulation on the "go" frequency carrier identifying the call code of the station being called and also containing control bits identifying that the call is a priority call. If the "subscriber" being called is not busy with another call, his apparatus responds to the alert signal in the usual way, determines that the incoming call is on the priority channel and replies by sending the "return" frequency carrier modulated with a ringing tone as usual. However, if the called "subscriber" is busy with another call, the controller 40 of his set does not immediately react to the alert signal on the highway. As mentioned previously, alert signals for normal non-priority calls have a maximum duration of typically two seconds. For a priority call, the alert signal is maintained for longer than this maximum duration, say three seconds. When the set of the called "subscriber" recognises that the alert signal has been present on the highway for more than the normal time, indicating that the call is a priority call, the controller 40 of the called "subscriber" momentarily retunes its receiver circuits to the "go" frequency of the priority channel and tries to read the code modulated on the carrier at this frequency. It will be appreciated that all busy stations will react to a priority call signal in this way and the various stations will continue to check the repeated code signals on the priority channel "go" frequency carrier for a predetermined time, say two hundred miliseconds, before reverting to their existing call if they cannot match the called code read from the carrier with their own call code. If they do match codes, the called "subscriber" apparatus responds by initially tuning back their receiving circuit to the existing established call but signalling to the person using the set by sending pips on line 67 to the receiver that they have a priority call. Typically there may be five pips at one second intervals following which the controller 40 automatically retunes their receiving circuits to the "go" frequency of the priority channel. In the meantime, the synthesizer 50 continues to generate the frequencies keeping the transmitted carrier and local oscillator signal on the existing operational channel. At the end of the five second delay, the controller 40 also instructs the synthesizer to generate on line 56 the "return" frequency carrier of the priority channel.

Meanwhile, the priority caller is arranged to maintain the priority alert signal on the highway for the longer than usual duration, say three seconds whereupon the alert is automatically removed. However, the priority caller continues to wait for a period of time for any "return" signal carrier to be received in case the called station was already busy in which case there is the five seconds delay before the called station generates the "return" carrier. Thus, the priority caller may wait a total of ten seconds following initiating the alert signal before providing an unobtainable tone. If during that ten seconds, the "return" frequency carrier is received, the priority channel link is completed and the intended conversation can proceed.

Figure 6:
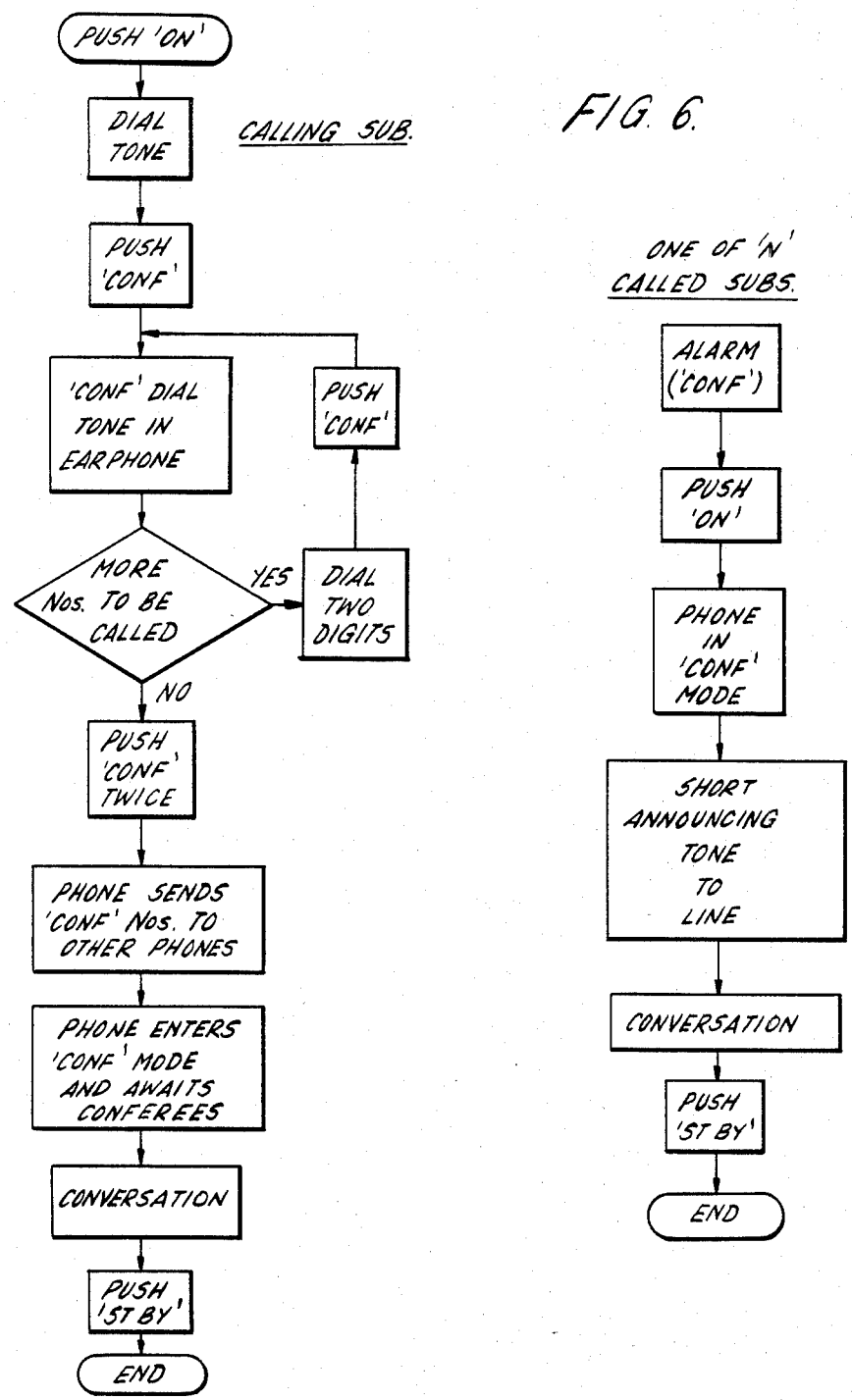

The apparatus of the present example may also provide a conference mode in which a number of stations may be able to talk to each other simultaneously in the manner of a conference. The conference mode employs audio frequency signalling on the highway. The functional flow diagram used in conference mode operation is shown in FIG. 6. Operation is as usual except that on hearing the dial tone, the calling station presses the CONF key on his key pad whereupon the controller 40 should generate the conference dial tone. The caller then keys the codes of the stations he wishes to call for the conference, pressing the CONF key once between each station call code. After the last call code keyed in, the caller presses the CONF button twice whereupon the controller 40 generates data on the line 61 for modulation on a "go" carrier frequency of a free channel, identifying all the call codes of the stations to be called. The data modulated on the "go" carrier also includes control bits identifying that the call is a conference call. The call codes are transmitted on the "go" frequency carrier for a predetermined time set by the controller 40 and are then automatically terminated whereupon the controller 40 inhibits further generation of the "go" carrier frequency and sends control signals on line 70 to switch the switches 54 and 59 into the conference mode bypassing the modulation and demodulation circuits so that direct audio frequency signals from the microphone 30 are transmitted to the highway and received from the highway by the receiver 31.

Meanwhile, each called station reacts to the alert signal applied to the highway by the calling station in the usual way scanning for a "go" frequency carrier with code modulation. On detecting its own call code, the called station also identifies from the received data that the call is a conference call and generates a special conference alarm tone to alert the user of the apparatus. No "return" carrier signal is generated. When the user of the apparatus answers the alarm by pressing the ON key, the apparatus immediately reverts to the conference mode with the controller 40 operating the switches 54 and 59. At the same time, the controller 40 generates a short tone on line 61 which is impressed on the highway 10 to alert the caller station that a further called "subscriber" has come onto line.

On termination of the conference, each "subscriber" depresses his STBY key in order to return his apparatus to the quiescent state.

It will be appreciated that the above described arrangement permits a field telephone system to be set up using a single wire pair highway but permitting multiple simultaneous duplex conversations between different "subscriber" stations. The highway cable should be terminated correctly at its ends with its characteristic impedance to avoid reflections. However, the connections from the "subscribers" to the cable have substantially no effect on the propogation properties of the cable since the "subscriber" sets each present a very high impedance to the cable. Interface units may be connected to the cable enabling interfacing of the particular cable net with other communication systems. For example referring again to FIG. 1, block 11 provides an interface between the highway cable 10 and a remotely controllable radio transmitter 22. The interface 11 is designed to respond to signals on the highway 10 in the same manner as an ordinary "subscriber" set. However, once a channel is established between a "subscriber" set and the interface 11, control signals can also be transmitted on the highway cable 10 for controlling operation of the radio 22. In this arrangement, the key pads of the various "subscriber" sets are continuously on line even during a conversation. Thus, if any of the numerical keys is depressed during a conversation, the apparatus automatically transmits the relevant code for the depressed key suppressing the voice transmission. Thus, the key pad of each "subscriber" set can be used for controlling radio transmission by the radio 22 e.g. with one key providing a TRANSMIT instruction to the radio and a second key providing a RECEIVE instruction.

What is claimed is:

1. A communication method for providing duplex communication between a plurality of pairs of stations on a single wire pair highway by frequency division multiplexing, each station having a station-identifying call code, the highway being assigned a plurality of pairs of frequencies for communication thereover, each pair of frequencies including a go frequency and a return frequency, said method comprising:
   maintaining all presently non-communicating stations in a quiescent mode in which each monitors the highway for alert signals;
   activating a quiescent station desiring to transmit information as a caller station to a called station by having such caller station monitor frequency pairs on the highway to select a pair of presently unused frequencies and, upon selecting such a pair of frequencies, to apply an alert signal and the go frequency of the selected pair of frequencies to the highway, the go frequency being modulated by the call code of the called station;
   activating all quiescent stations in response to receipt thereby of the alert signal for monitoring of call codes on the go frequency of the selected pair of frequencies;

initiating transmission on the highway, by that station which was activated by the alert signal and which corresponds to the call code, of the return frequency of the selected pair of frequencies, while returning all noncalled stations which were activated by the alert signal to the quiescent condition; and activating the caller station in response to receipt by it of the return frequency of the selected pair of frequencies to transmit on the highway the go frequency of the selected pair of frequencies modulated by the information to be transmitted.

2. A communication method as claimed in claim 1 wherein each station activated by the alert signal monitors the highway for a go frequency modulated by a call code and upon receipt of a call code compares the received call code with its own call code to determine whether it is the called station.

3. A communication method as claimed in claim 1 wherein the caller station responds to receiving the return frequency from the called station by cancelling the alert signal from the highway, causing all non-called stations which were activated by the alert signal to revert to the quiescent condition.

4. A communication method as claimed in claim 3 wherein the quiescent stations, upon being activated in response to receipt of the alert signal, monitor the pairs of frequencies by scanning the return frequencies thereof to identify a return frequency absent from the highway, on locating an absent return frequency tuning to the corresponding go frequency of the respective pair of frequencies and, if the go frequency is present on the highway, checking for call code data on that go frequency, but otherwise continuing the scanning of the return frequencies.

5. A communication method as claimed in claim 1 for use in telephony, wherein the caller station modulates the go frequency with the call codes of selected called stations desired to join the call as a conference call and also a signal identifying the call as a conference call, the caller station terminating said go frequency generation and modulation after a predetermined time interval sufficient to permit the called stations to identify their respective call codes and then providing audio frequency communication with the highway, each called station responding to receipt of its call code and identifying that the call is a conference call by providing audio frequency communication with the highway.

6. A communication method as claimed in claim 1, further comprising assigning a selected pair of said pairs of frequencies as a priority channel for use only by a priority call station in a priority mode to call a station already busy with an existing call or when all non-priority channels are busy, and the busy station called on the priority channel responds by breaking contact with the existing call and moving to the priority channel to take the priority call.

7. A communication method as claimed in claim 6 wherein, in priority mode, a priority caller station checks the go frequency of the priority channel and, if such frequency is absent on the highway, generates and transmits the priority go frequency onto the highway, modulating such frequency with at least data defining the call code of the desired called station, and simultaneously generates and impresses on the highway a priority call identifying signal, and wherein each busy station responds to the priority call identifying signal by tuning to the go frequency of the priority channel, reading the call code modulated thereon, and comparing the call code with the respective call code assigned to the station, and then in response to identifying its own call code moving onto the priority channel but otherwise continuing with the existing call.

8. A communication method as claimed in claim 7 wherein, in normal mode, the caller station maintains the alert signal in the absence of a received corresponding return frequency for a predetermined maximum time, and wherein, in priority mode the priority call identifying signal comprises the alert signal and is maintained for a period of time in excess of the predetermined maximum time, and each busy station responds to the priority call identifying signal only after the predetermined maximum time has elapsed.

9. A communication set capable of providing, with other such sets at respective stations, duplex communication simultaneously between a plurality of pairs of stations on a single wire pair highway by frequency division multiplexing, wherein information is transmitted on the wire pair highway by modulation of pairs of predetermined carrier frequencies, each pair of said frequencies comprising a go frequency and a return frequency and providing a single channel duplex communication between any selected pair of stations on the highway, each station being assigned a predetermined call code; the communication set comprising means for storing the call code assigned to the respective station, transmitter means energisable and controllable to generate and transmit to the highway carrier signals at a selected one of the predetermined carrier frequencies, modulator means for modulating the generated carrier signal with information or data to be transmitted on the highway, tunable receiver means for selectively receiving carrier signals from the highway at any one of the predetermined carrier frequencies, demodulator means for demodulating information or data from the received carrier signal, operator input means enabling the operator of the set to initiate a call and key in the call code of a desired station, control means responsive to a call initiate signal from the input means to scan the tuning of the receiver means through said predetermined carrier frequencies until a vacant channel is identified, the respective pair of carrier frequencies for the channel being absent on the highway, and then to tune to the return frequency of the vacant channel, the control means including means to energise and control the transmitter means to transmit on to the highway a carrier signal at the go frequency of the vacant channel and simultaneously supply to the modulator means at least data from the input means defining the call code of the desired station so that the transmitted carrier signal is modulated with said data, the control means further including means responsive to reception by the receiver means of a carrier on the highway at the return frequency of the vacant channel to inhibit further supply of the call code data to the modulator means, and an alert signal generator responsive to the control means on identifying a vacant channel to impress an alert signal on the highway until reception by the receiver means of said receive frequency carrier.

10. A communication set as claimed in claim 9 further comprising quiescent switching means arranged to switch the set to a quiescent state when not in use but responsive to the presence of an alert signal on the highway to switch the set automatically to a non-quiescent state, and means within the control means responsive on said switching to the non-quiescent state to scan the tuning of the receiver means to detect a go frequency carrier signal on the highway which is modulated with call code data, and then to read said data and compare the received call code with that in said means for storing, the control means further including means responsive to the received call code matching that in said means for storing to hold the set in the non-quiescent state and to energise and control the transmitter means to transmit on to the highway a carrier signal at the return frequency of the channel including the detected go frequency carrier signal.

* * * * *